US010366263B2

(12) United States Patent
Bataller et al.

(10) Patent No.: US 10,366,263 B2
(45) Date of Patent: Jul. 30, 2019

(54) OBJECT DETECTION FOR VIDEO CAMERA SELF-CALIBRATION

(71) Applicant: Accenture Global Solutions Limited, Dublin (IE)

(72) Inventors: Cyrille Bataller, Mougins (FR); Anders Astrom, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/395,770

(22) Filed: Dec. 30, 2016

(65) Prior Publication Data

US 2018/0189532 A1 Jul. 5, 2018

(51) Int. Cl.
*G06K 19/06* (2006.01)
*G06K 7/10* (2006.01)
(Continued)

(52) U.S. Cl.
CPC ........ *G06K 7/10811* (2013.01); *G06K 7/1417* (2013.01); *G06K 7/1443* (2013.01); *G06K 9/00671* (2013.01); *G06K 9/00771* (2013.01); *G06K 9/3216* (2013.01); *G06K 9/3233* (2013.01); *G06K 9/6267* (2013.01); *G06K 19/06037* (2013.01); *G06T 7/80* (2017.01)

(58) Field of Classification Search
CPC .. G06K 7/10; G06K 9/36; G06K 5/00; G06K 7/14; G06K 15/12; G06F 17/00
USPC ........... 235/462.11, 375, 462.1, 487, 462.41, 235/462.24
See application file for complete search history.

(56) References Cited

U.S. PATENT DOCUMENTS

2005/0135850 A1\* 6/2005 Gombert ................ G06Q 10/00
399/341
2005/0140779 A1\* 6/2005 Schulz .................. H04M 3/567
348/14.08
(Continued)

FOREIGN PATENT DOCUMENTS

EP 1551171 7/2005

OTHER PUBLICATIONS

European Search Report issued in European Application No. EP17197411, report completed Apr. 25, 2018, 7 pages.
(Continued)

*Primary Examiner* — Edwyn Labaze
(74) *Attorney, Agent, or Firm* — Fish & Richardson P.C.

(57) ABSTRACT

This document describes systems, methods, devices, and other techniques for video camera self-calibration based on video information received from the video camera. In some implementations, a computing device receives video information characterizing a video showing a scene from a field of view of a video camera; detects an object that appears in the scene of the video; identifies a visual marking that appears on the detected object; determines a particular visual marking among a plurality of pre-defined visual markings that matches the visual marking that appears on the detected object; identifies one or more object characteristics associated with the particular visual marking; evaluates one or more features of the video with respect to the one or more object characteristics; and based on a result of evaluating the one or more features of the video with respect to the one or more object characteristics, sets a parameter of the video camera.

20 Claims, 6 Drawing Sheets

(51) Int. Cl.
*G06T 7/80* (2017.01)
*G06K 9/32* (2006.01)
*G06K 9/62* (2006.01)
*G06K 9/00* (2006.01)
*G06K 7/14* (2006.01)

(56) References Cited

U.S. PATENT DOCUMENTS

| | | | | |
|---|---|---|---|---|
| 2013/0169822 | A1* | 7/2013 | Zhu | G06T 7/80 |
| | | | | 348/180 |
| 2016/0026253 | A1* | 1/2016 | Bradski | G02B 27/225 |
| | | | | 345/8 |
| 2016/0283798 | A1* | 9/2016 | Goldner | G06K 9/00778 |
| 2016/0350921 | A1* | 12/2016 | Bataller | G06T 7/80 |
| 2016/0370220 | A1* | 12/2016 | Ackley | G01B 11/02 |
| 2016/0378117 | A1* | 12/2016 | Szatmary | B25J 5/00 |
| | | | | 382/153 |
| 2017/0024889 | A1* | 1/2017 | Brown | B60R 11/04 |

OTHER PUBLICATIONS

Rasmus et al. "Fast calibration of industrial mobile robots to workstations using QR codes," IEEE ISR Oct. 24, 2013, 6 pages.

* cited by examiner

OBJECT DETECTION FOR VIDEO CAMERA SELF-CALIBRATION

TECHNICAL FIELD

This specification generally relates to methods, systems, devices, and other techniques for video monitoring, including techniques for calibrating cameras used in a video monitoring system.

BACKGROUND

Video monitoring systems (e.g., a closed-circuit television system) can provide one or more video cameras to monitor at least one location in view of the cameras. Some video monitoring systems are configured to transmit video signals from the one or more cameras to a central location for presentation on a limited set of monitors, and in certain instances, for recording and additional analysis. For example, a video monitoring system may be adapted to capture and analyze video from various locations including banks, casinos, airports, military installations, convenience stores, parking lots, or the like. Video information from video cameras of video monitoring systems may be sent to and analyzed by a video analytics platform.

SUMMARY

This document generally describes systems, methods, devices, and other techniques for configuring cameras in a video monitoring system. A video monitoring system may include one or more computers that receive video content captured by one or more video cameras. The system may analyze the video content and perform various analytics processes to detect certain events and other features of interest. For example, the system may apply analytics processes to perform facial recognition, generate safety alerts, identify vehicle license plates, perform post-event analysis, count people or objects in a crowd, track objects across multiple cameras, perform incident detection, recognize objects, index video content, monitor pedestrian or vehicle traffic conditions, detect objects left at a scene, identify suspicious behavior, or perform a combination of multiple of these.

Some video analytics processes rely on parameters associated with video cameras that captured video content that is the subject of analysis. For example, a vehicle detection process may identify the make and model of a vehicle based in part on real-world dimensions of the vehicle derived from the video content, such as its height or width in inches. But in order for the vehicle detection process to determine the real-world dimensions of a vehicle in view of a video camera, it may be required that one or more parameters associated with the camera are calibrated, e.g., the physical location of the camera relative to a ground plane, reference object, or both. In some implementations according to the techniques described herein, a video monitoring system can analyze video content captured by the one or more cameras, query a database of stored information about objects detected in the video content and set parameters that may be needed for one or more other video analytics processes based on information in the database. For example, by comparing dimensions of a detected object as it appears in the video content to the real-world dimensions of the object as stored in a remote database, the system may automatically determine a distance of the camera from the object.

Innovative aspects of the subject matter described in this specification may be embodied in methods that include the actions of receiving, by a computing system, video information that characterizes a video showing a scene from a field of view of a video camera; detecting, by the computing system and based on analysis of the video information, an object that appears in the scene of the video; identifying, by the computing system, a visual marking that appears on the detected object; determining, by the computing system, a particular visual marking, among a plurality of pre-defined visual markings available to the computing system, that matches the visual marking that appears on the detected object; identifying, based on stored data that correlates the plurality of pre-defined visual markings with characteristics of respective objects on which the pre-defined visual markings can appear, one or more object characteristics associated with the particular visual marking that matches the visual marking that appears on the detected object; evaluating one or more features of the video with respect to the one or more object characteristics associated with the particular visual marking; and based on a result of evaluating the one or more features of the video with respect to the one or more object characteristics associated with the particular visual marking, setting a parameter of the video camera.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations the visual marking comprises a quick-response (QR) code.

In some implementations the visual marking comprises an encoded pattern printed on the detected object that uniquely identifies the detected object.

In some implementations each of the plurality of pre-defined visual markings identify a unique set of object characteristics.

In some implementations the unique set of object characteristics comprise one or more of (i) real-world dimensions of the object and (ii) real-world location of the object.

In some implementations evaluating one or more features of the video with respect to the one or more object characteristics associated with the particular visual marking comprises comparing dimensions of the object as they appear in the video to the real-world dimensions of the object to determine a distance of the camera from the object.

In some implementations setting a parameter of the video camera comprises setting a focal length of the video camera based on the determined distance.

In some implementations setting a parameter of the video camera comprises determining and storing a geographic location of the video camera based on the determined distance and real-world location of the object.

In some implementations the visual marking comprises one or more colours, and the unique set of object characteristics associated with the visual marking identifies the one or more colours of the visual marking.

In some implementations evaluating one or more features of the video with respect to the one or more object characteristics associated with the particular visual marking comprises comparing a colorization of the visual marking as it appears in the video to the one or more colours indicated by the unique set of object characteristics associated with the visual marking.

In some implementations setting a parameter of the video camera comprises adjusting a colour setting of the video camera.

In some implementations the unique set of object characteristics indicate that the object is located on a ground plane.

In some implementations setting a camera parameter of the video camera comprises determining an orientation of the camera relative to the ground plane.

In some implementations the unique set of object characteristics comprise a height of the object above the ground plane.

In some implementations evaluating one or more features of the video with respect to the one or more object characteristics associated with the particular visual marking comprises modeling the ground plane of the scene.

In some implementations the detected object comprises a rotakin. In some implementations (i) the detected object comprises a card, and (ii) the visual marking that appears on the detected object comprises a glyph printed on the card.

In some implementations identifying one or more object characteristics associated with the particular visual marking that matches the visual marking that appears on the detected object comprises querying a remotely stored database.

Further innovative aspects of the subject matter described in this specification may be embodied in methods that include the actions of receiving, by a computing system, video information that characterizes a video showing a scene from a field of view of a video camera; detecting, by the computing system and based on analysis of the video information, an object that appears in the scene of the video; applying, by the computing system, a bounding box in the field of view around the detected object; classifying, by the computing system, the detected object as a particular object; determining, based on stored data that correlates objects with respective object characteristics, one or more properties of the bounding box in the field of view around the detected object; evaluating one or more features of the video with respect to the one or more properties of the bounding box in the field of view around the detected object; and based on a result of evaluating the one or more features of the video with respect to the one or more properties of the bounding box in the field of view around the detected object, setting a parameter of the video camera.

Implementations of the subject matter described herein may realize, in certain instances, one or more of the following advantages.

Video monitoring systems and applications may be greatly aided if video cameras included in the video monitoring system are calibrated, e.g., if video camera intrinsic parameters and the video camera position and orientation with respect to some reference point in a scene captured by the video camera are known. Manual camera calibration can be a time consuming and tedious process, particularly in large scale CCTV environments that may include tens or hundreds of individual video cameras.

A system implementing object detection for video camera self-calibration, as described in this specification, provides a practical and efficient way to calibrate video cameras, e.g., in a large-scale video monitoring system. The system is able to automatically set video camera parameters without requiring human intervention.

A system implementing object detection for video camera self-calibration, as described in this specification, may achieve higher levels of computational efficiency compared to other systems and methods for video camera calibration since the system described in this specification sets particular video camera parameters based on querying a database to obtain information about visual markings that appear in the video. By accessing such information, the system avoids the need to infer the information itself, thus saving the computational time and reducing the computational complexity of video camera calibration. In addition, video camera calibration as performed by the system described in this specification may achieve higher levels of calibration accuracy, since information about the visual markings that appear in the video that is stored in the database may be highly accurate and optimized for the particular visual marking.

A system implementing object detection for video camera self-calibration, as described in this specification, may be more flexible than other systems and methods for video camera calibration since the accuracy achieved by the system described in this specification is variable dependent on the input to the calibration method. For example, by identifying an increased number of visual markings that appear on objects in a scene of an environment captured by a video camera, the system described in this specification may achieve higher levels of accuracy.

A system implementing object detection for video camera self-calibration, as described in this specification, increases an amount of intelligence provided to a video analytics platform, enabling the video analytics platform to better recognize objects and auto calibrate video cameras to accurately derive data about location, speed and direction of movement of recognized objects or anomalies including unusual locations, speeds and/or directions of movement, or unusual objects, e.g., people or animals on a highway. In addition, a system implementing object detection for video camera self-calibration, as described in this specification, can be readily applied to moving cameras such as Pan-Tilt-Zoom cameras as well as mobile/wearable/in-vehicle cameras. Such cameras can greatly benefit from the use of the system implementing object detection for video camera self-calibration, since such cameras cannot use traditional systems because every time the field of view changes, e.g., the camera moves, a new calibration needs to be made.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification generally describes systems, methods, devices, and other techniques for performing video camera self-calibration. For example, systems and methods consistent with the disclosed embodiments may receive video information that characterizes a video showing a scene from a field of view of a video camera and analyze the video information to detect an object that appears in the scene of the video. The disclosed systems and methods may identify a visual marking that appears on the detected object and determine a particular visual marking that matches the visual marking that appears on the detected object from among a plurality of pre-defined visual markings available to the computing system. Based on stored data that correlates the plurality of pre-defined visual markings with characteristics of respective objects on which the pre-defined visual markings can appear, the disclosed systems and methods identify one or more object characteristics associated with the particular visual marking that matches the visual marking that appears on the detected object and evaluate one or more features of the video with respect to the one or more object characteristics associated with the particular visual marking.

Based on a result of evaluating the one or more features of the video with respect to the one or more object characteristics associated with the particular visual marking, a parameter of the video camera is set. For example, a video analytics platform included in the described system may automatically configure colour settings of a video camera by detecting one or more objects shown in video content captured by the video camera, identifying a visual marking shown on one of the detected objects and querying a database of information relating to the identified visual marking to determine whether the current colour settings have strayed from calibrated values.

Figure 1:
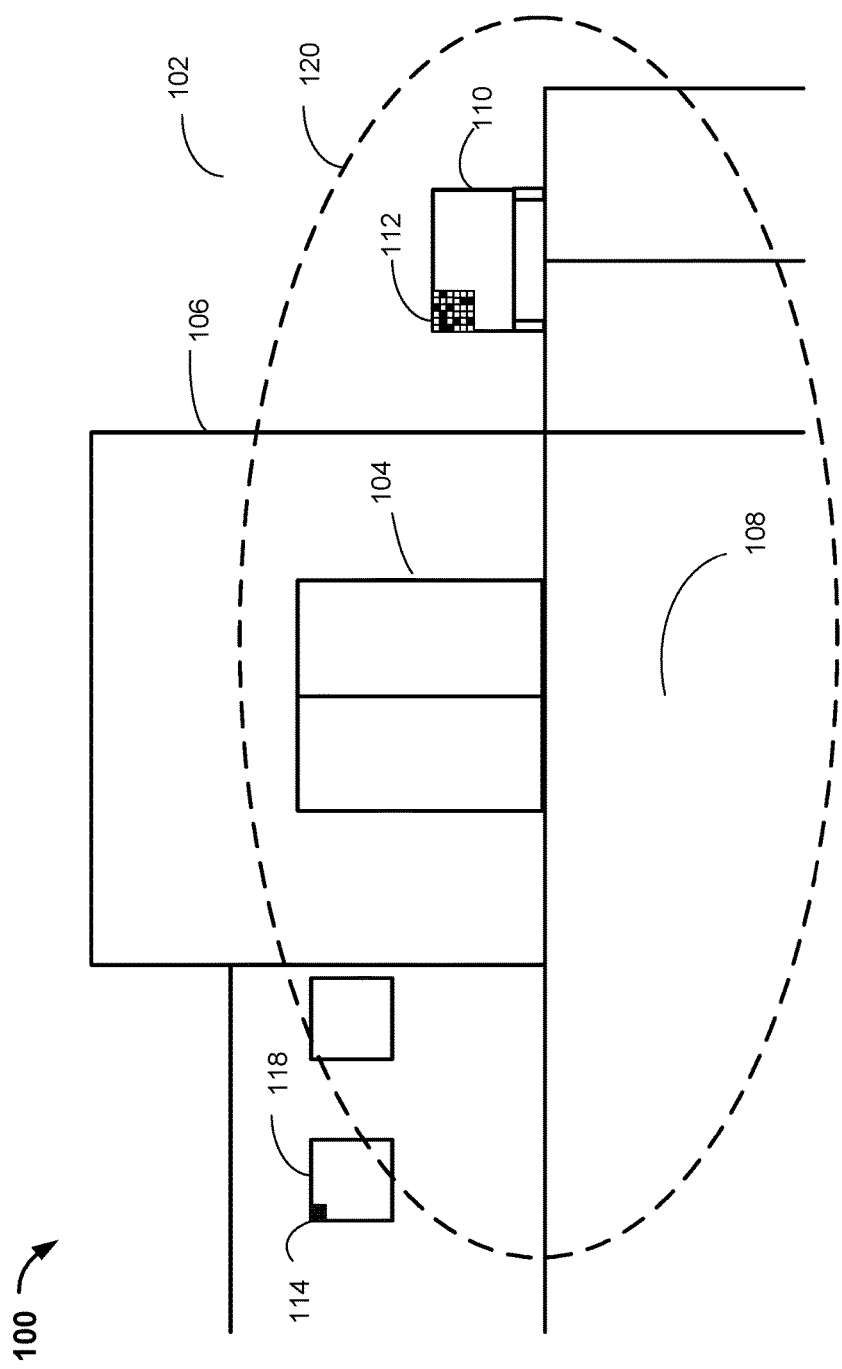
FIG. 1 depicts an example image showing a scene from a field of view of a video camera.

FIG. 1 depicts an example image 100 showing a scene from a field of view 120 of a video camera. The scene is an example scene of a real-world environment 102 including a building 104, an entrance 104 to the building 106, an area 108 in front of the building 106 and a street sign 110. For example, the video camera may be installed outside a bank or convenience store and may pan the area outside the bank or convenience store to monitor the movement of people or traffic.

The video camera may capture video information that characterizes a video showing the scene 120. The captured video information may be provided for analysis, e.g., to a video analytics platform as described below with reference to FIGS. 2-4, and one or more objects that appear in the scene 120 may be detected. For example, a video analytics platform may analyze video information that characterizes a video showing the scene 120 and detect the street sign 110. The type of objects detected by the video analytics platform depends on the real-world environment 102 in which the video camera is located. In some cases the objects detected by the video analytics platform may include objects that usually appear in the real-world environment, such as street signs, post boxes, doors or business signs. In some cases the objects detected by the video analytics platform may include objects that are purposely places in the real-world environment to assist video camera calibration, e.g., rotakins or other target board tools. Each detected object may be described by a respective set of object characteristics, including real-world dimensions of the object, a real-world location of the object, colorization of the object, or orientation of the object.

In some cases a visual marking may appear on a detected object. For example, visual marking 112 appears on street sign 110. A visual marking may include a quick-response (QR) code, i.e., a readable optical label that contains information about the item to which it is attached, or any encoded pattern that is printed on the detected object. In some cases the visual marking may include one or more colours. A visual marking that appears on a detected object may be used to uniquely identify the object. In some settings multiple visual markings may appear on multiple respective objects, e.g., visual marking 112 on street sign 110 and visual marking 114 on window 118.

The video camera that captures the video information characterizing a video showing the scene 120 may use detected objects, e.g., street sign 110 or window 118, and identified visual markings, e.g., visual marking 112 or visual marking 114, to perform self-calibration. Self-calibration may be achieved by setting one or more values of video camera parameters to one or more respective estimated values. Example video camera parameters can include intrinsic video camera parameters, e.g., focal length, principal point, aspect ratio and skew, or extrinsic video camera parameters, e.g., video camera height, pan, tilt and roll. Using detected objects and identified visual markings to perform video camera self-calibration is described in more detail below with reference to FIGS. 2 and 4.

Figure 2:
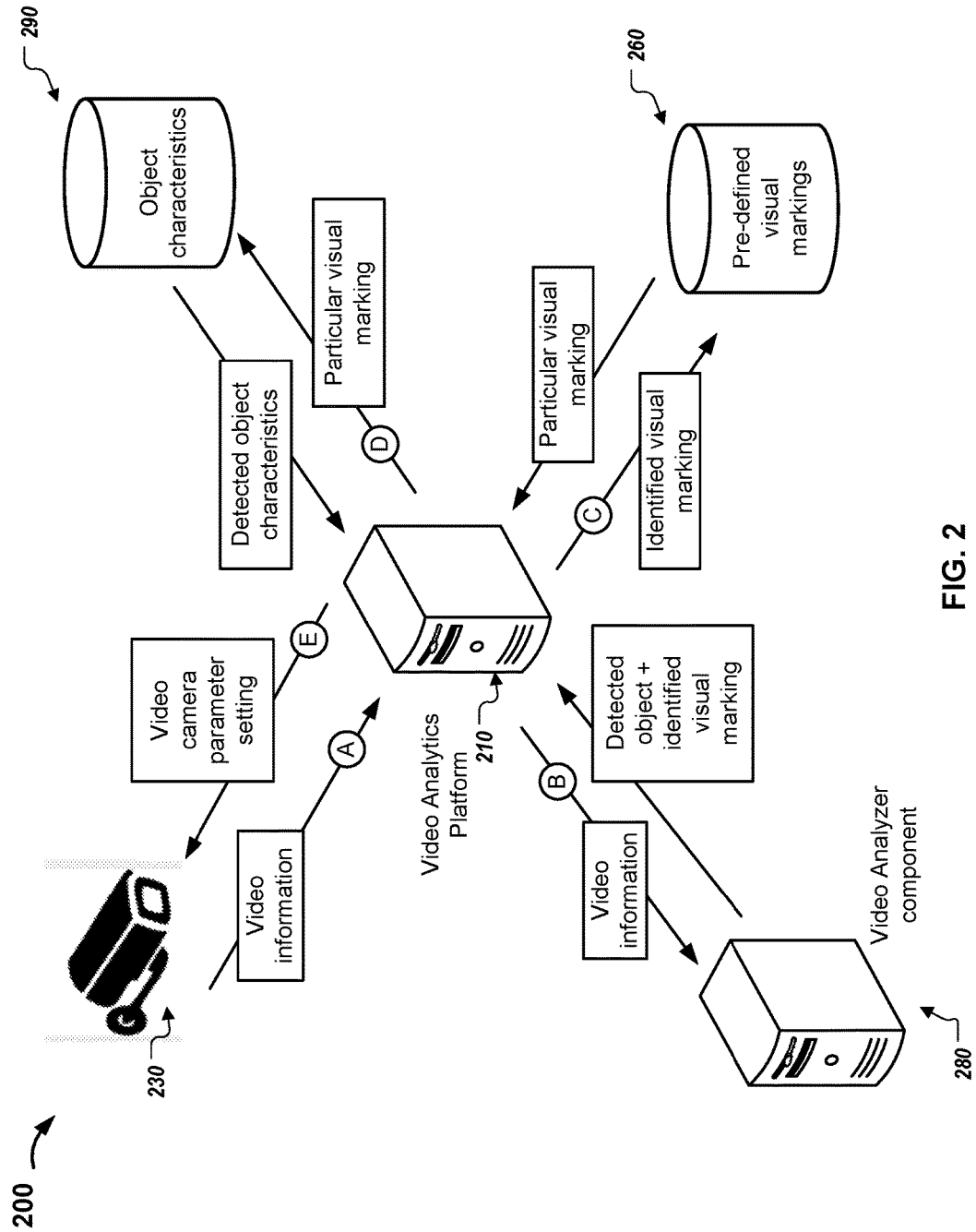
FIG. 2 depicts a conceptual block diagram of an example process for video camera self-calibration.

FIG. 2 depicts a conceptual block diagram of an example process for video camera self-calibration. The system 200 can be enabled to receive data that represents a video information that characterizes a video showing a scene from a field of view of a video camera 230. The video information may be analyzed to detect one or more objects that appear in the scene and to identify one or more visual markings that appear on the one or more objects. Based on the identified visual markings, the system 200 may determine calibration instructions including values for one or more video camera parameters. The system 200 may provide data representing the calibration instructions to the video camera 230 for processing. Generally, the system 200 can be implemented as a system of one or more computers having physical hardware like that described with respect to FIG. 5 below. The computing system may include one or more computers that operate in a coordinate fashion across one or more locations.

Briefly, the system 200 includes a video analytics platform 210 and a video camera 230. The video analytics platform 210 may include, or otherwise have access to a video analyzer component 280. In addition, the video analytics platform 210 may access one or more remote databases, e.g., pre-defined visual markings database 260 or object characteristics database 290. The components of the system 200 can exchange electronic communications over one or more networks, or can exchange communications in another way, such as over one or more wired or wireless connections.

During stage (A) of the process for video camera self-calibration, the video analytics platform 210 receives data representing video information from the video camera 230. The video information may be a video signal characterizing a video showing a scene from a field of view of the video camera 230, e.g., scene 120 of FIG. 1 above.

During stage (B), the video analytics platform 210 can transmit data that represents the video information to the video analyzer component 280. The video analyzer component 280 can receive the data that represents the video information and analyze the video information to detect one or more objects that appear in the scene of the video characterized by the video information. The video analyzer component 280 further identifies a visual marking that appears on one of the detected one or more objects. For example, as illustrated above with reference to FIG. 1, the video information may characterize a video showing a scene 120 from outside a bank or convenience store. In this case, the video analyzer component 280 may detect the street sign 110 and identify the visual marking 112 that appears on the street sign 110. In some implementations the video analyzer component 280 may have one or more object detection software applications installed thereon that are configured to or may be used to detect objects and visual markings in a video signal.

The video analyzer component 280 can transmit data that represents the identified visual marking and detected object on which the visual marking appears to the video analytics platform 210. The video analytics platform 210 can receive the data that represents the identified visual marking and detected object on which the visual marking appears.

During stage (C), the video analytics platform 210 determines a particular visual marking from among multiple pre-defined visual markings available to the system 200 that matches the visual marking that appears on the detected object. For example, the video analytics platform 210 may access one or more external databases 260 that store pre-defined visual markings to determine a particular visual marking that matches the visual marking that appears on the detected object.

During stage (D), the video analytics platform 210 identifies one or more object characteristics associated with the particular visual marking that matches the visual marking that appears on the detected object. For example, the video analytics platform 210 may access stored data in one or more external databases 290 that correlates the multiple pre-defined visual markings with characteristics of respective objects on which the pre-defined visual markings can appear.

The video analytics platform 210 evaluates one or more features of the video characterized by the video information with respect to the identified one or more object characteristics associated with the particular visual marking that matches the visual marking that appears on the detected object. Based on the evaluation, the video analytics platform 210 determines one or more parameters that require calibrating and generates optimal values for the one or more parameters. Evaluating features of a video with respect to object characteristics in order to set one or more video camera parameters is described in more detail below with reference to FIG. 4.

During stage (E), the video analytics platform 210 transmits data that instructs the video camera 230 to set one or more of the video camera parameters to the generated values. In some implementations the system 200 may repeat stages (B)-(E) to set multiple video camera parameters based on multiple detected objects and identified visual markings that appear on the respective detected objects.

Figure 3:
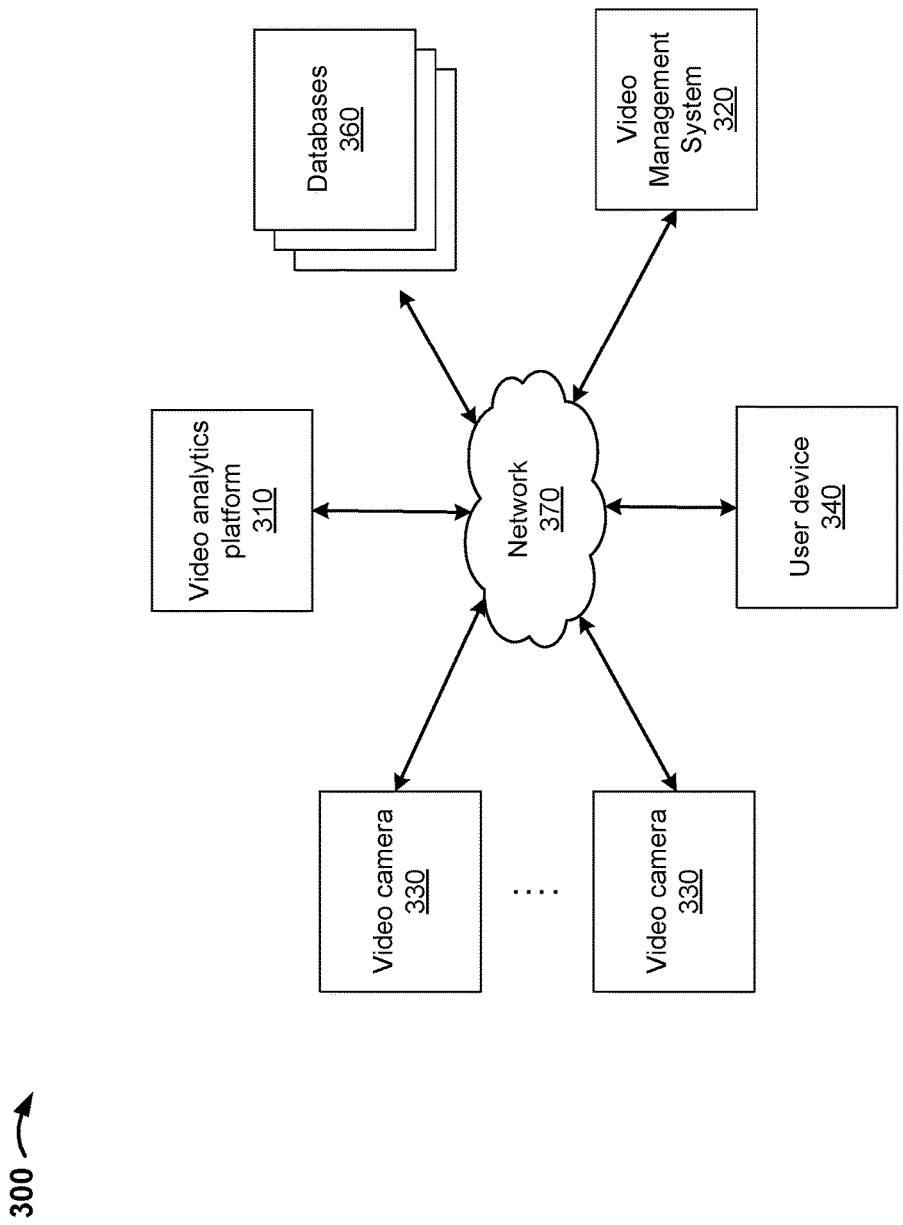
FIG. 3 depicts an example system for video camera self-calibration.

FIG. 3 depicts an example system 300 for video camera self-calibration. In some implementations, a computer network 370, such as a local area network (LAN), wide area network (WAN), the Internet, or a combination thereof, connects video analytics platform 310, video management system 320, multiple video cameras 330, user device 340 and databases 360. In some implementations, all or some of the video analytics platform 310, video management system 320, multiple video cameras 330, user device 340 and databases 360 can be implemented in a single computing system, and may communicate with none, one, or more other components over a network.

Video analytics platform 310 may include one or more devices capable of receiving, generating, storing, processing, and/or providing information, such as information described herein. For example, video analytics platform 310 may include one or more computing devices, such as one or more server devices, desktop computers, workstation computers, virtual machines (VMs) provided in a cloud computing environment, or similar devices. In some implementations, video analytics platform 310 may receive video information from video management systems 320 and/or video cameras 330, and may store the video information. In some implementations, video analytics platform 310 may receive video information and/or other information (e.g., fire alarms, weather alerts, or the like) from other devices and/or systems, such as, for example, social media systems, mobile devices, emergency service systems (e.g., police, fire department, weather agencies, or the like), building management systems, or the like.

In some implementations, video analytics platform 310 may apply video analytics to automatically analyze the video information and to generate real-time safety information, security information, operations information, or marketing information. The safety information may include information associated with utilization of restricted or forbidden areas, fire and/or smoke detection, overcrowding and/or maximum occupancy detection, slip and/or fall detection, vehicle speed monitoring, or the like. The security information may include information associated with perimeter monitoring, access control, loitering and/or suspicious behavior, vandalism, abandoned and/or removed objects, person of interest tracking, or the like. The operations information may include information associated with service intervention tracking, package and/or vehicle count, mobile asset locations, operations layout optimization, resource monitoring and/or optimization, or the like. The marketing information may include information associated with footfall traffic, population density analysis, commercial space layout optimization, package demographics, or the like.

In some implementations, the video analytics applied by video analytics platform 310 may include people recognition, safety alert generation, license plate recognition, augmented reality, post-event analysis, crowd counting, cross-camera tracking, incident detection, wide-spectrum imagery, object recognition, video indexing, traffic monitoring, footfall traffic determination, left object detection, suspicious behavior detection, or the like. In some implementations, video analytics platform 310 may generate a user interface that includes the real-time safety information, the security information, the operations information, or the marketing information, and may provide the user interface to user device 340. User device 340 may display the user interface to a user of user device 340.

In some implementations, the video analytics platform 310 may communicate with databases 360 to obtain information stored by the databases 360. For example, the databases 360 may include one or more databases that store pre-defined visual markings, e.g., QR codes or other encoded patterns, which may appear on one or more objects shown in a video captured by video cameras 330. As another example, the databases 360 may include one or more databases that store information about one or more objects, such as information relating to characteristics of objects including real-world dimensions of objects, colours, or real-world locations. In some cases one or more of the databases 360 may be external to the system 300. In other cases one or more of the databases 360 may be included in the system 300.

Video management system 320 may include one or more devices capable of receiving, generating, storing, processing, and/or providing information, such as information described herein. For example, video management system 320 may include a computing device, such as a server, a desktop computer, a laptop computer, a tablet computer, a handheld computer, one or more VMs provided in a cloud computing environment, or a similar device. In some implementations, video management system 320 may be associated with a company that receives, stores, processes, manages, and/or collects information received by video cameras 330. In some implementations, video management systems 320 may communicate with video analytics platform 310 via network 370.

Video camera 330 may include a device capable of receiving, generating, storing, processing, and/or providing video information, audio information, and/or image information. For example, video camera 330 may include a photographic camera, a video camera, a microphone, or a similar device. In some implementations, video camera 330 may include a PTZ video camera. In some implementations, video camera 330 may communicate with video analytics platform 310 via network 370.

User device 340 may include a device capable of receiving, generating, storing, processing, and/or providing information, such as information described herein. For example, user device 340 may include a computing device, such as a desktop computer, a laptop computer, a tablet computer, a handheld computer, a smart phone, a radiotelephone, or a similar device. In some implementations, user device 340 may communicate with video analytics platform 310 via network 350.

Network 370 may include one or more wired and/or wireless networks. For example, network 370 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a cloud computing network, and/or a combination of these or other types of networks.

Figure 4:
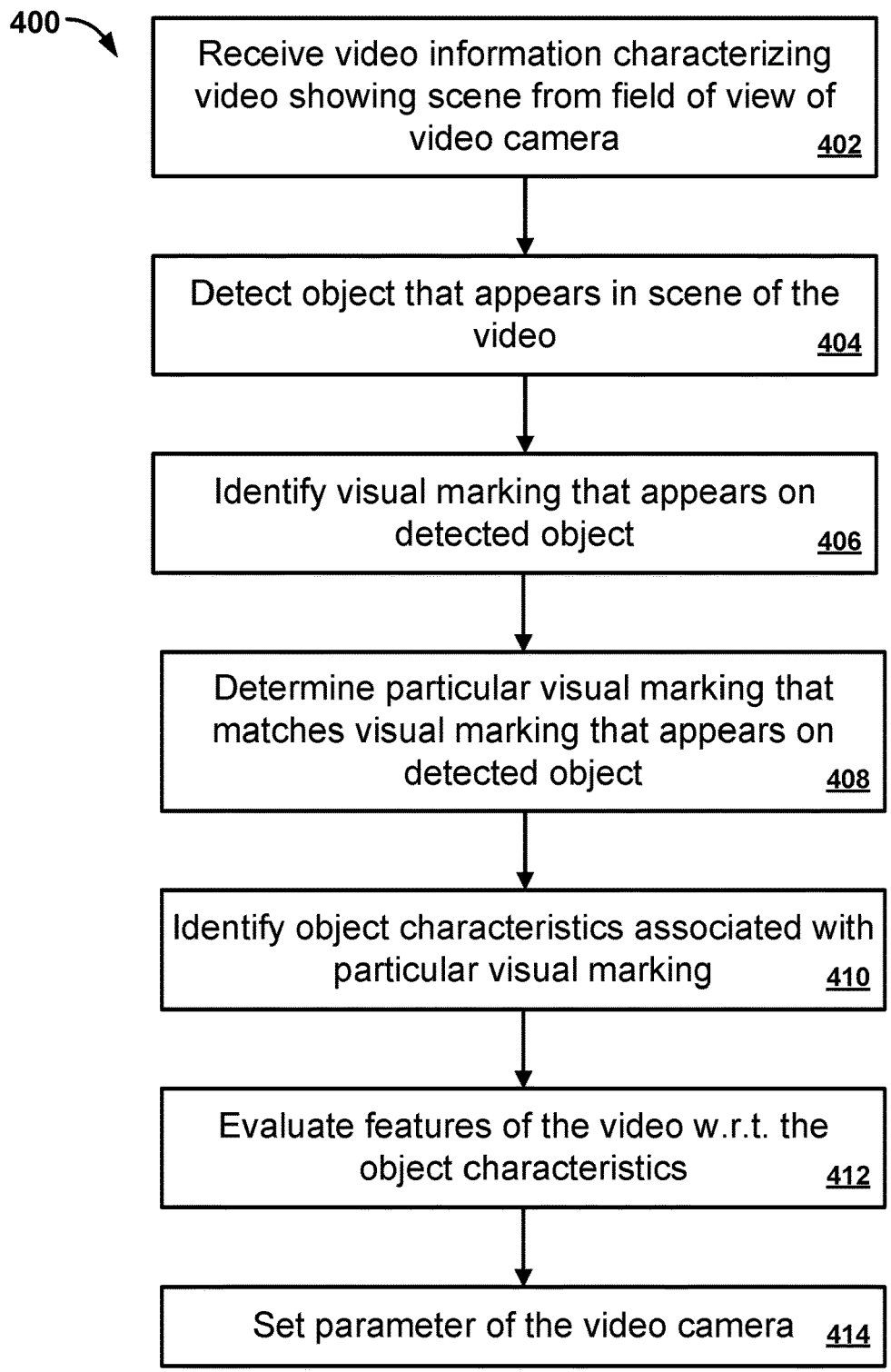
FIG. 4 is a flowchart of an example process for video camera self-calibration.

FIG. 4 is a flowchart of an example process 400 for video camera self-calibration. In some implementations, the process 400 may be carried out by the devices and systems described herein, including computing system 300 depicted in FIG. 3. Although the flowchart depicts the various stages of the process 400 occurring in a particular order, certain stages may in some implementations be performed in parallel or in a different order than what is depicted in the example process 400 of FIG. 4.

At stage 402, the system receives, by a computing system, video information that characterizes a video showing a scene from a field of view of a video camera.

At stage 404, the system detects, by the computing system and based on analysis of the video information, an object that appears in the scene of the video. The object may be a permanent fixture in the scene of the video or may be an object that is temporarily shown in the scene of the video. The type of object detected by the system is dependent on the scene shown by the video captured by the video camera. For example, in some implementations the scene shown by the video may include a portion of a city center. In this case example objects may include permanent fixture in the scenes, e.g., buildings or signposts or temporary objects, e.g., parked cars or poster advertisements.

In some implementations the object may include an object whose purpose is to assist video camera calibration. For example, the object may be a rotakin that has been positioned on the ground in the scene in order to assist video camera calibration. As another example, a card showing a particular visual marking may be used to assist video camera calibration. In these examples the object detected by the system may include the card, e.g., the card may be laid on the ground in the scene in order to assist video camera calibration and the system may detect the card as an object appearing in the scene. Alternatively, the card may be laid on an object appearing in the scene, e.g., on a postbox or a car, and the system may detect the object on which the card is lying. In some implementations different cards, e.g., with differing visual markings, may be laid on different objects that appear in the scene.

At stage 406, the system identifies, by the computing system, a visual marking that appears on the detected object. In some implementations the visual marking may include an encoded pattern printed on the detected object that uniquely identifies the detected object. For example, in some implementations the visual marking may include a quick-response (QR) code that has been printed on the detected object. As another example, in some implementations detected object may include a card that has been placed in the scene, e.g., laid on the ground or on an object appearing in the scene, and the visual marking may include a glyph that has been printed on the card.

In some implementations the visual marking may include one or more colours. For example, a visual marking may include an encoded pattern printed on the detected object in one or more colours such as red, green and blue (RGB).

At stage 408, the system determines, by the computing system, a particular visual marking among a plurality of pre-defined visual markings available to the computing system that matches the visual marking that appears on the detected object. For example, the system may identify a glyph that has been printed on a card that appears in the scene of the video and read the glyph to determine a particular glyph among multiple pre-defined visual markings that matches the glyph that appears on the card. Each of the plurality of pre-defined visual markings identify a unique set of object characteristics.

At stage 410, the system identifies, based on stored data that correlates the plurality of pre-defined visual markings with characteristics of respective objects on which the pre-defined visual markings can appear, one or more object characteristics associated with the particular visual marking that matches the visual marking that appears on the detected object. For example, the system may identify one or more object characteristics associated with the particular visual marking by querying a remotely stored database that stores the data that correlates the plurality of pre-defined visual markings with characteristics of respective objects on which the pre-defined visual markings can appear. The database can be queried using a code represented by the visual marking.

The one or more object characteristics may include information about characteristics of the object and not only of the identified visual marking. In some implementations the one or more object characteristics include one or more of (i)

real-world dimensions of the detected object, and (ii) real-world location of the detected object. Real-world dimensions of an object include real-world measurements of the dimensions, e.g., height, width and depth, of the object. A real-world location of an object may include real-world coordinates, e.g., GPS coordinates, that specify a location of the object. In some cases, if the object is large, a real-world location of the object may correspond to a real-world location of a feature of the object, e.g., an entrance to a building. In some cases, a real-world location of an object may correspond to a real-world location of the visual marking that appears on the detected object.

For example, as described above, the detected object may include a card that was laid on the ground in the scene to assist video camera calibration. In this example, the one or more object characteristics may include one or more of (i) real-world dimensions of the card, e.g., width by length of the card, (ii) real world location of the card, e.g., the location at which the card was laid on the ground. As another example, as described above, the detected object may include an object on which a card was laid to assist video camera calibration. In this example, the object may be an object of standard or known dimensions or location, and the one or more object characteristics may include one or more of (i) the known dimensions of the object, and (ii) known location of the object.

In some implementations the one or more object characteristics include an indication that the detected object is located on a ground plane or is located at a certain distance above a ground plane, or an orientations of the detected object. For example, as described above, in some cases the detected object may include a card or rotakin that was purposely laid on the ground (or laid in a position that is a known distance above the ground plane) in order to assist video camera calibration. In some implementations the one or more object characteristics include a colorization of the detected object. For example, some objects such as post boxes or street signs may include standard colorizations. As another example, a card with a printed visual marking may include a standard colorization. In addition, as described above with reference to stage 406, in some implementations the visual marking may include one or more colours. In these implementations the one or more object characteristics may identify the one or more colours of the visual marking.

At stage 412, the system evaluates one or more features of the video with respect to the one or more object characteristics associated with the particular visual marking, i.e., the one or more object characteristics of the detected object that is associated with the particular visual marking. For example, as described above with reference to stage 410, in some implementations the system may identify real-world dimensions of the object associated with the particular visual marking. In this case, evaluating one or more features of the video with respect to the one or more object characteristics associated with the particular visual marking may include comparing dimensions of the object as they appear in the video to the real-world dimensions of the object to determine a distance of the camera from the object. For example, in some cases the dimensions of an object as it appears in a video may differ to the real-world dimensions of the object, e.g., the dimensions of the object as it appears in the video may be smaller than the real-world dimensions of the object.

As another example, as described above with reference to stage 410, in some implementations the one or more object characteristics may identify one or more colours of the object or of the visual marking. In this case, evaluating one or more features of the video with respect to the one or more object characteristics associated with the particular visual marking may include comparing a colorization of the object or of the visual marking as they appear in the video to the one or more colours indicated by the object characteristics associated with the visual marking. For example, in some cases the colorization of an object or visual marking as it appears in a video may differ to real-world colors of the object or visual marking, e.g., the colours as they appear in the video may be darker than the real-world colours.

As another example, in some implementations the one or more object characteristics may be used to model the ground plane of the scene. For example, the system may identify multiple objects that appear in the scene and the one or more respective object characteristics may include object heights above the ground plane, e.g., their tallness. Evaluating one or more features of the video with respect to the object characteristics may include modeling the ground plane based on the known object elevations.

At stage 414, the system sets a parameter of the video camera. The system sets the parameter of the video camera based on a result of evaluating the one or more features of the video with respect to the one or more object characteristics associated with the particular visual marking, as described above with reference to stage 412. For example, as described above with reference to stages 410 and 412, in some implementations the system may identify real-world dimensions of the detected object and compare dimensions of the object as they appear in the video to the real-world dimensions of the object to determine a distance of the camera from the object. In this case, the system may set a focal length of the video camera based on the determined distance of the camera from the object.

As another example, as described above with reference to stage 410 and 412, in some implementations the system may identify real-world dimensions of the detected object and an real-world location of the detected object and compare dimensions of the object as they appear in the video to the real-world dimensions of the object to determine a distance of the camera from the object. In this case, the system may determine and store a geographic location of the video camera based on the determined distance of the camera from the detected object and the real-world location of the detected object.

As another example, as described above with reference to stage 412, in some implementations the system may compare a colorization of the visual marking as it appears in the video to the one or more colours indicated by the one or more object characteristics associated with the visual marking. In this case, the system may adjust a colour setting of the video camera based on the comparison of the colorization of the visual marking as it appears in the video to one or more colours indicated by the one or more object characteristics.

As another example, as described above with reference to stage 410, in some implementations the one or more object characteristics may indicate that the object is located on a ground plane. In this case the system may determine an orientation of the video camera relative to the ground plane.

As another example, as described above with reference to step 412, in some implementations the system may model a ground plane of the scene based on known object elevations. In this case the system may calibrate one or more video camera parameters using the modeled ground plane.

Stages 406-414 of the process 400 may be repeated for multiple objects with visual markings that are detected by the video camera in order to set multiple parameters of the video camera. For example, in some implementations a video camera may pan an area and therefore have a changing field of view. In this example, upon detecting an object with a visual marking in a new field of view the system may perform stages 406-414 to further set one or more video camera parameters. As another example, an object specifically designed for assisting video camera self-calibration, e.g., a rotakin, may be placed in the camera's field of view. In this example, upon detecting the placement of the object, the system may perform stages 406-414 to further set one or more video camera parameters.

In some implementations, stages 406-414 of the process 400 may be repeated for different types of visual markings separately. For example, the system may first analyze and compare color features of a detected object. The system may analyze colour features, e.g., colorization and white-balance, by capturing a color-appearance (which may differ in different lighting conditions, different camera sensors etc.) from one or more objects with known true colors. In some implementations this may be achieved using a color reference chart on the calibration card. In other implementations this may be achieved by analyzing the color appearance of specific section of an object of an identified type with known true colors, e.g., the true color of the text on a police car. The system may then apply stages 406-414 to analyze and compare patterns of the detected object, followed by other types of visual markings such as focus, etc.

Figure 5:
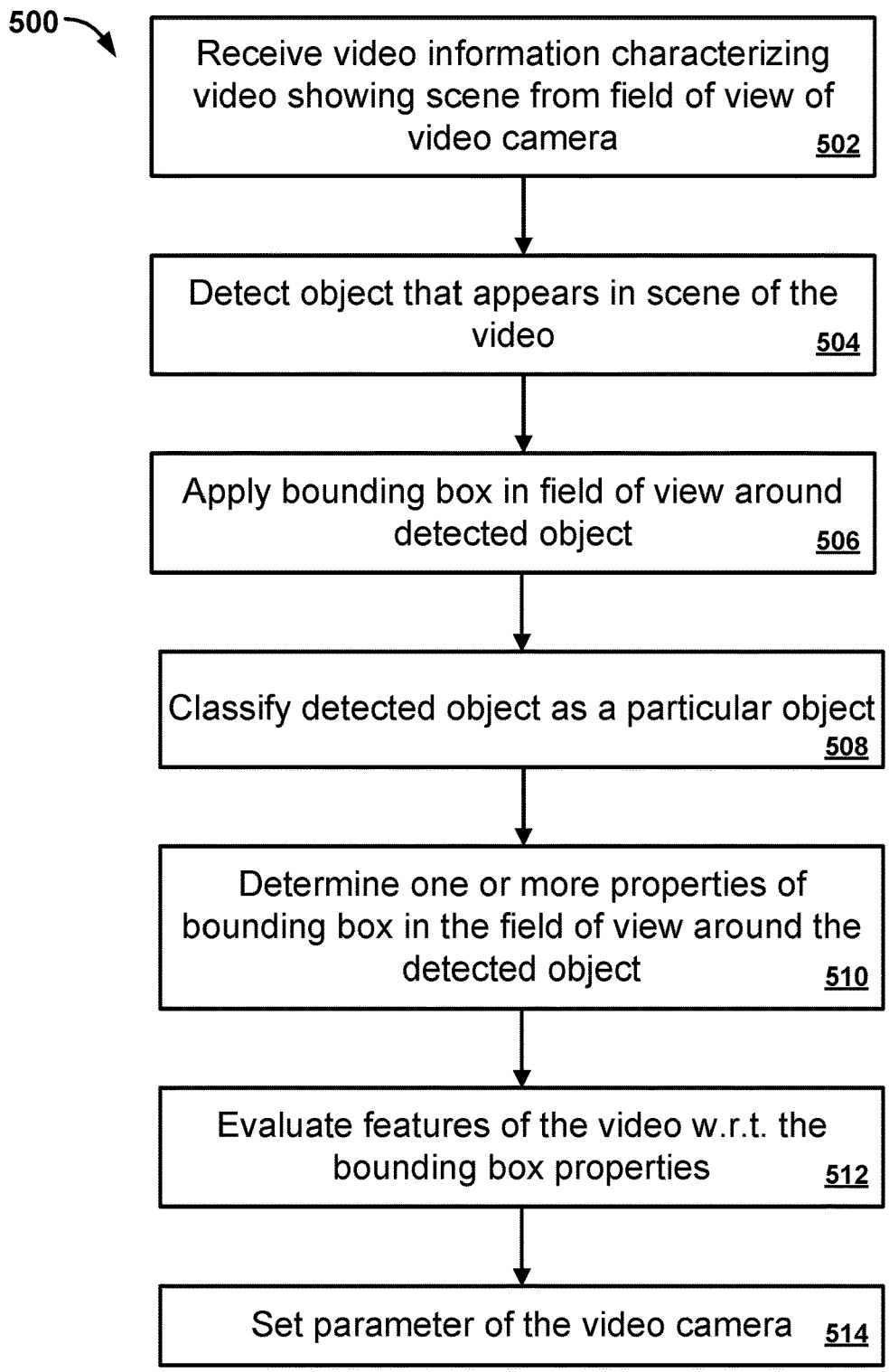
FIG. 5 is a flowchart of an example process for video camera self-calibration.

FIG. 5 is a flowchart of an example process 500 for video camera self-calibration. In some implementations, the process 500 may be carried out by the devices and systems described herein, including computing system 300 depicted in FIG. 3. Although the flowchart depicts the various stages of the process 500 occurring in a particular order, certain stages may in some implementations be performed in parallel or in a different order than what is depicted in the example process 500 of FIG. 5.

At stage 502, the system receives video information that characterizes a video showing a scene from a field of view of a video camera.

At stage 504, the system detects, based on analysis of the video information, an object that appears in the scene of the video. The object may be a permanent fixture in the scene of the video or may be an object that is temporarily shown in the scene of the video. The object may be a stationary object or a moving object. For example, the system may detect a moving object as a collection of moving pixels in the field of view of the video camera. The type of object detected by the system is dependent on the scene shown by the video captured by the video camera. For example, in some implementations the scene shown by the video may include a portion of a city center. In this case example objects may include stationary objects, such as buildings or parked cars, or moving objects, such as people or traffic.

At stage 506, the system applies a bounding box in the field of view around the detected object. The bounding box may include a box with the smallest two-dimensional area within which the detected object lies. If the detected object is a moving object, e.g., a walking pedestrian, the bounding box may follow the moving object through the scene. For example, the system may discretize the video information into multiple frames of video information and apply the bounding box at each frame.

At stage 508, the system classifies the detected object as being a particular object. In some implementations the system may classify the detected object using a deep learning object recognition classifier, e.g., a neural network trained for image recognition. For example, the system may crop the video around the bounding box and classify the detected object by providing the cropped video or image for classification. The classification of the detected object as being a particular object may include one or more keywords. In some implementations the system may perform coarse grained classification, e.g., the one or more keywords include coarse labels such as person, car, or street sign. In other implementations the system may perform fine grained classification, e.g., the one or more keywords include fine labels such as child, silver Audi Q7, stop sign.

At stage 510, the system determines, based on stored data that correlates objects with respective object characteristics, one or more properties of the bounding box in the field of view around the particular object. For example, the system may query a remotely stored database that stores data that correlates keywords output by the object recognition classifier described above with reference to step 508 with characteristics of objects referenced by the keywords. Object characteristics can include real-world dimensions of an object. Real-world dimensions of an object include real-world measurements of the dimensions, e.g., height, width and depth, of the object. In some cases, the system may determine real-world dimensions of the bounding box in the field of view based on stored data that correlates objects with real-world dimensions of the object. For example, the system may classify an object as being a person, e.g., a woman. In this example, the system may query a remotely stored databased to determine an average height for women. Based on the determined average height, the system may determine a real-world height of the bounding box in the field of view, e.g., the determined height of the bounding box may equal the determined average height.

Object characteristics can include a real-world location of an object. A real-world location of an object may include real-world coordinates, e.g., GPS coordinates, that specify a location of the object. In some cases, the system may determine a real-world location of the bounding box in the field of view based on stored data that correlates objects with their real-world location. For example, the system may classify the object as being a particular building. In this example the system may query a remotely stored database to determine a location of the particular building. Based on the determined location, the system may determine a real-world location of the bounding box in the field of view, e.g., the location of the bounding box may be equal to the location of the building.

Other example object characteristics can include a real-world colour of an object. Real-world colours of an object includes a colorization of the object as it appears in the real world. In some cases, the system may determine an average or predominant real-world colour of pixels included in the bounding box based on stored data that correlates objects with their real world colours. For example, the system may classify an object as being a London taxi cab. In this example, the system may query a remotely stored database to determine an average or predominant colour of London taxi cabs, e.g., black. Based on the determined average or predominant colour, the system may determine an average or predominant real-world colour for the pixels located in the bounding box, e.g., the colorization of the pixels in the bounding box may equal the determined average or predominant colour.

At stage 512, the system evaluates one or more features of the video with respect to the one or more properties of the bounding box in the field of view around the detected object. For example, as described above, in some cases the properties of the bounding box in the field of view may include real-world dimensions of the bounding box. In this case, evaluating one or more features of the video with respect to the one or more properties of the bounding box in the field of view around the detected object may include comparing real-world dimensions of the bounding box to the dimensions of the bounding box as it appears in the video. As another example, as described above, in some cases the properties of the bounding box in the field of view may include a real-world colorization of pixels included in the bounding box. In this case, evaluating one or more features of the video with respect to the one or more properties of the bounding box may include comparing the real-world colorization of the pixels in the bounding box to the colorization as they appear in the video.

At stage 514, based on a result of evaluating the one or more features of the video with respect to the one or more properties of the bounding box in the field of view around the detected object, the system sets a parameter of the video camera. As described above with reference to FIG. 4, example video camera parameters can include video camera height, vertical angle, field of view and video camera location. For example, based on comparing real-world dimensions of a bounding box to the dimensions of the bounding box as it appears in the video, the system may derive a height, vertical angle and field of view of the video camera. In some implementations video camera height, vertical angle and field of view (expressed as either or both horizontal and/or vertical view angle) may make up a minimal set of calibration parameters. However, optionally, additional video camera calibration parameters may also be measured and used for calibration, including focus, colour and lens distortion.

Figure 6:
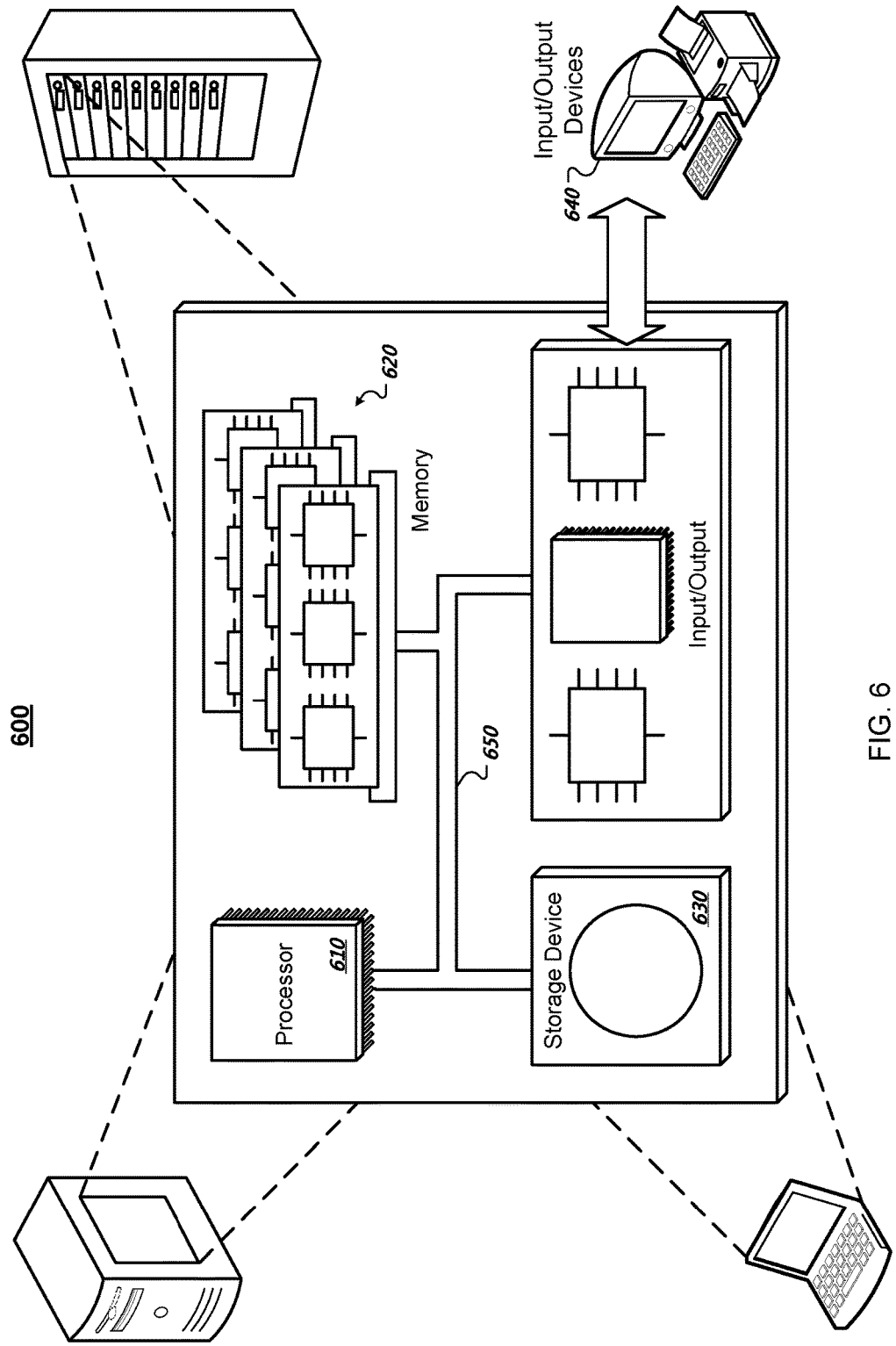
FIG. 6 depicts an example computing device that may be used to carry out the computer-implemented methods and other techniques described herein.

FIG. 6 illustrates a schematic diagram of an exemplary generic computer system 600. The system 600 can be used for the operations described in association with the process 400 according to some implementations. The system 600 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 600 includes a processor 610, a memory 620, a storage device 630, and an input/output device 640. Each of the components 610, 620, 630, and 620 are interconnected using a system bus 650. The processor 610 may be enabled for processing instructions for execution within the system 600. In one implementation, the processor 610 is a single-threaded processor. In another implementation, the processor 610 is a multi-threaded processor. The processor 610 may be enabled for processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 may be enabled for providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method for performing video camera self-calibration, comprising:

receiving, by a computing system, video information that characterizes a video showing a scene from a field of view of a video camera that is to be self-calibrated;

detecting, by the computing system and based on analysis of the video information, an object that has been placed in the scene of the video for use in assisting with self-calibration of the video camera, the object having an attached, computer-readable, visual marking that identifies the object to which it is attached;

identifying, by the computing system, the visual marking that is attached to the detected object that has been placed in the scene of the video for use in assisting with self-calibration of the video camera;

determining, by the computing system, a particular visual marking, among a plurality of pre-defined visual markings available to the computing system, that matches the visual marking that appears on the detected object that has been placed in the scene of the video for use in assisting with self-calibration of the video camera;

identifying, based on stored data that correlates the plurality of pre-defined visual markings with characteristics of respective objects on which the pre-defined visual markings can appear and which are used for assisting with self-calibration of video cameras, one or more real-world object characteristics that are defined for objects having the particular visual marking that appears on the detected object that has been placed in the scene of the video for use in assisting with self-calibration of the video camera, wherein the one or more real-world object characteristics comprise at least one of a physical dimension of the object, a real-world location of the object, a color of the object, or an orientation of the object;

comparing one or more characteristics of the detected object that has been placed in the scene of the video for use in assisting with self-calibration of the video camera as they appear in the video to respective ones of the one or more real-world object characteristics that are defined for objects having the particular visual marking that appears on the detected object;

automatically self-calibrating the video camera based on a result of comparing one or more characteristics of the detected object that has been placed in the scene of the video for use in assisting with self-calibration of the video camera as they appear in the video to respective ones of the one or more real-world object characteristics that are defined for objects having the particular visual marking that appears on the detected object, comprising:

selecting a setting for an operational parameter of the video camera, wherein the operational parameter of the video camera comprises at least one of a focal length, a principal point, an aspect ratio, a skew, a colorisation, a lens distortion, a height of the video camera, a tilt angle of the video camera, or a roll angle of the video camera; and setting the operational parameter of the video camera according to the selected setting.

2. The method of claim 1, wherein the visual marking comprises a quick-response (QR) code.

3. The method of claim 1, wherein the visual marking comprises an encoded pattern printed on the detected object that uniquely identifies the detected object.

4. The method of claim 1, wherein each of the plurality of pre-defined visual markings identify a unique set of multiple real-world object characteristics.

5. The method of claim 4, wherein the unique set of multiple real-world object characteristics comprises one or more of (i) a physical dimension of the detected object or (ii) a real-world location of the detected object.

6. The method of claim 5, comprising comparing a dimension of the detected object as it appears in the video to the physical dimension of the detected object to determine a distance of the video camera from the detected object.

7. The method of claim 6, wherein selecting a setting for an operational parameter of the video camera comprises selecting a setting for the focal length of the video camera, and wherein setting the operational parameter of the video camera according to the selected setting comprises setting the focal length of the video camera based on the determined distance of the video camera from the detected object.

8. The method of claim 6, wherein selecting a setting for an operational parameter of the video camera comprises selecting a real-world location of the video camera, and wherein setting the operational parameter of the video camera according to the selected setting comprises storing an indication of the geographic location of the video camera based on the determined distance of the video camera from the detected object and the real-world location of the detected object.

9. The method of claim 4, wherein the visual marking comprises one or more colors, and wherein the unique set of multiple real-world object characteristics that are defined for objects having the visual marking identifies the one or more colors of the visual marking.

10. The method of claim 9, comprising comparing a colorization of the visual marking as it appears in the video to the one or more colors indicated by the unique set of multiple real-world object characteristics that are defined for objects having the visual marking.

11. The method of claim 10, wherein selecting a setting for an operational parameter of the video camera comprises selecting a color setting of the video camera, and wherein setting the operational parameter of the video camera comprises adjusting a color setting of the video camera.

12. The method of claim 4, wherein the unique set of multiple real-world object characteristics indicate that the detected object is located on a ground plane.

13. The method of claim 12, wherein selecting a setting for an operational parameter of the video camera comprises selecting an orientation of the video camera, and wherein setting the operational parameter of the video camera comprises determining an orientation of the camera relative to the ground plane.

14. The method of claim 13, wherein the unique set of multiple real-world object characteristics comprise a height of the object above the ground plane, and wherein the method comprises modeling the ground plane within the scene.

15. The method of claim 1, wherein (i) the detected object comprises a card, and (ii) the visual marking that appears on the detected object comprises a glyph printed on the card.

16. The method of claim 1, wherein identifying one or more real-world object characteristics that are defined for objects having the particular visual marking that appears on the detected object comprises querying a remotely stored database.

17. The method of claim 1, comprising determining a spatial relationship between the video camera and the detected object, and wherein selecting a setting for an operational parameter of the video camera comprises selecting a setting for an operational parameter based on the determined spatial relationship between the video camera and the detected object.

18. The method of claim 1, comprising:

comparing a colorization of the visual marking as it appears in the video to the one or more colours indicated by the unique set of real world object characteristics that are defined for objects having the visual marking; and comparing dimensions of the object as they appear in the video to the real-world dimensions of the object to determine a distance of the camera from the object; and selecting a setting for an operational parameter of the video camera comprises:

selecting a color setting of the video camera, and wherein setting the operational parameter of the video camera comprises adjusting a colour setting of the video camera; and selecting a setting for the focal length of the video camera, and wherein setting the operational parameter of the video camera according to the selected setting comprises setting the focal length of the video camera based on the determined distance.

19. A system for performing video camera self-calibration, the system comprising:

one or more processors; and one or more computer-readable media having instructions stored thereon which, when executed by the one or more processors, cause the one or more processors to perform operations comprising:

receiving, by a computing system, video information that characterizes a video showing a scene from a field of view of a video camera that is to be self-calibrated;

detecting, by the computing system and based on analysis of the video information, an object that has been placed in the scene of the video for use in assisting with self-calibration of the video camera, the object having an attached, computer-readable, visual marking that identifies the object to which it is attached;

identifying, by the computing system, the visual marking that is attached to the detected object that has been placed in the scene of the video for use in assisting with self-calibration of the video camera;

determining, by the computing system, a particular visual marking, among a plurality of pre-defined visual markings available to the computing system, that matches the visual marking that appears on the detected object that has been placed in the scene of the video for use in assisting with self-calibration of the video camera;

identifying, based on stored data that correlates the plurality of pre-defined visual markings with characteristics of respective objects on which the pre-defined visual markings can appear and which are used for assisting with self-calibration of video cameras, one or more real-world object characteristics that are defined for objects having the particular visual marking that appears on the detected object that has been placed in the scene of the video for use in assisting with self-calibration of the video camera, wherein the one or more real-world object characteristics comprise at least one of a physical dimension of the object, a real-world location of the object, a color of the object, or an orientation of the object;

comparing one or more characteristics of the detected object that has been placed in the scene of the video for use in assisting with self-calibration of the video camera as they appear in the video to respective ones of the one or more real-world object characteristics that are defined for objects having the particular visual marking that appears on the detected object;

automatically self-calibrating the video camera based on a result of comparing one or more characteristics of the detected object that has been placed in the scene of the video for use in assisting with self-calibration of the video camera as they appear in the video to respective ones of the one or more real-world object characteristics that are defined for objects having the particular visual marking that appears on the detected object, comprising:

selecting a setting for an operational parameter of the video camera, wherein the operational parameter of the video camera comprises at least one of a focal length, a principal point, an aspect ratio, a skew, a colorisation, a lens distortion, a height of the video camera, a tilt angle of the video camera, or a roll angle of the video camera; and setting the operational parameter of the video camera according to the selected setting.

20. A non-transitory computer-readable storage device storing software for performing video camera self-calibration, the software comprising instructions executable by one or more computers which, upon such execution, cause the one or more computers to perform operations comprising:

receiving, by a computing system, video information that characterizes a video showing a scene from a field of view of a video camera that is to be self-calibrated;

detecting, by the computing system and based on analysis of the video information, an object that has been placed in the scene of the video for use in assisting with self-calibration of the video camera, the object having an attached, computer-readable, visual marking that identifies the object to which it is attached;

identifying, by the computing system, the visual marking that is attached to the detected object that has been placed in the scene of the video for use in assisting with self-calibration of the video camera;

determining, by the computing system, a particular visual marking, among a plurality of pre-defined visual markings available to the computing system, that matches the visual marking that appears on the detected object that has been placed in the scene of the video for use in assisting with self-calibration of the video camera;

identifying, based on stored data that correlates the plurality of pre-defined visual markings with characteristics of respective objects on which the pre-defined visual markings can appear and which are used for assisting with self-calibration of video cameras, one or more real-world object characteristics that are defined for objects having the particular visual marking that appears on the detected object that has been placed in the scene of the video for use in assisting with self-calibration of the video camera, wherein the one or more real-world object characteristics comprise at least one of a physical dimension of the object, a real-world location of the object, a color of the object, or an orientation of the object;

comparing one or more characteristics of the detected object that has been placed in the scene of the video for use in assisting with self-calibration of the video camera as they appear in the video to respective ones of the one or more real-world object characteristics that are defined for objects having the particular visual marking that appears on the detected object;

automatically self-calibrating the video camera based on a result of comparing one or more characteristics of the detected object that has been placed in the scene of the video for use in assisting with self-calibration of the video camera as they appear in the video to respective ones of the one or more real-world object characteristics that are defined for objects having the particular visual marking that appears on the detected object, comprising:

selecting a setting for an operational parameter of the video camera, wherein the operational parameter of the video camera comprises at least one of a focal length, a principal point, an aspect ratio, a skew, a colorisation, a lens distortion, a height of the video camera, a tilt angle of the video camera, or a roll angle of the video camera; and setting the operational parameter of the video camera according to the selected setting.

* * * * *